(12) United States Patent
Elliot

(10) Patent No.: US 7,633,870 B2
(45) Date of Patent: Dec. 15, 2009

(54) NETWORK FORWARDING DEVICE AND METHOD THAT FORWARD TIMING PACKETS THROUGH THE DEVICE WITH A CONSTANT DELAY

(75) Inventor: Robert Mark Elliot, Santa Rosa, CA (US)

(73) Assignee: Symmetricom, Inc., San Jose, CA (US)

( * ) Notice: Subject to any disclaimer, the term of this patent is extended or adjusted under 35 U.S.C. 154(b) by 865 days.

(21) Appl. No.: 11/108,429

(22) Filed: Apr. 18, 2005

(65) Prior Publication Data

US 2006/0251084 A1 Nov. 9, 2006

(51) Int. Cl.
*G01R 31/08* (2006.01)
*G06F 11/00* (2006.01)
*H04L 12/28* (2006.01)
*H04L 12/56* (2006.01)
*H04J 3/06* (2006.01)

(52) U.S. Cl. ............... 370/235; 370/395.21; 370/508; 370/519

(58) Field of Classification Search ........... 370/230, 370/230.1, 231, 235, 395.21, 395.4, 458, 370/508, 517, 519
See application file for complete search history.

(56) References Cited

U.S. PATENT DOCUMENTS

| | | | |
|---|---|---|---|
| 5,640,388 A | | 6/1997 | Woodhead et al. |
| 6,009,077 A | * | 12/1999 | Firoiu et al. ............ 370/230 |
| 6,259,695 B1 | * | 7/2001 | Ofek ..................... 370/389 |
| 6,768,730 B1 | * | 7/2004 | Whitehill ................ 370/348 |
| 2002/0039370 A1 | | 4/2002 | Elliot ..................... 370/503 |
| 2003/0002520 A1 | * | 1/2003 | Zwack .................... 370/458 |
| 2005/0226172 A1 | * | 10/2005 | Richardson et al. ....... 370/260 |

FOREIGN PATENT DOCUMENTS

| | | |
|---|---|---|
| WO | WO 01/95550 A2 | 6/2001 |
| WO | WO 01/95550 A3 | 6/2001 |
| WO | 01/95550 A2 | 12/2001 |

OTHER PUBLICATIONS

IEEE Standards 1588, "IEEE Standard For a Precision Clock Synchronization Protocol For Networked Measurement And Control Systems", Nov. 8, 2002, pp. 1-144.
Technical Committee On Sensor Technology TC-9, "IEEE 1588TM-2002 Standard For A Precision Clock Synchronization Protocol For Networked Measurement And Control Systems", IEEE Instrumentation And Measurement Society, Call For Papers: 2005 IEEE 1588 Conference, [online], [Retrieved on Apr. 18, 2005]. Retrieved from the Internet: http://ieee1588.nist.gov. pp. 1-21 (unnumbered).

(Continued)

*Primary Examiner*—Chirag G Shah
*Assistant Examiner*—Ashley L Shivers
(74) *Attorney, Agent, or Firm*—Mark C. Pickering

(57) ABSTRACT

The variable latency associated with standard network forwarding devices is eliminated by forwarding timing packets through a network forwarding device with a constant delay. The network forwarding device of the invention time stamps timing packets that are received by the input ports with a predefined future time, and then outputs the timing packets from the output ports at the predefined time so that the transmission delay through the network forwarding device is the same from any port to any other port.

8 Claims, 3 Drawing Sheets

OTHER PUBLICATIONS

Sven Nylund and Oyvind Homeide, "IEEE 1588 Ethernet Switch Transparency—No Need For Boundary Clocks!", OnTime Networks, [online], [Retrieved on Apr. 18, 2005]. Retrieved from the Internet: http://ieee1588.nist.gov/Presentation%20PDFs/10_IEEE1588%20Ethernet_Nylund.pdf. Presented at 2004 Conference on IEEE 1588, Standard For A Precision Clock Synchronization Protocol For Network Measurement And Control Systems, Sep. 27-29, 2004, pp. 1-16.

Sven Nylund and Oyvind Homeide, "IEEE 1588 Ethernet Switch Transparency—No Need For Boundary Clocks!", [online], [Retrieved on Apr. 18, 2005], Retrieved from the Internet: http://www.ontimenet.com/pdf/OnTime1588Transparencyv102004.pdf. pp. 1-4.

"IEEE 1588—Precise Time Synchronization As The Basis For Real Time Applications In Automation", [online], [Retrieved on Dec. 2, 2004], Retrieved from the Internet:http://www.industrialnetworking.com/support/general_faqs_info/Precise_Time_Sync.pdf. pp. 1-8 (unnumbered).

European Search Report for Application No. EP 06 006 929, dated Jun. 6, 2006, two pages.

Written Opinion of the Search Examiner for Application No. EP 06 006 929.1, dated of Form 1507, four pages.

European Second Office Action for Application No. EP 06 006 929.1, dated Dec. 17, 2007, two pages.

* cited by examiner

FIG. 1A (PRIOR ART) CLIENT OUT
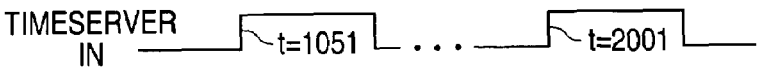
FIG. 1B (PRIOR ART) TIMESERVER IN
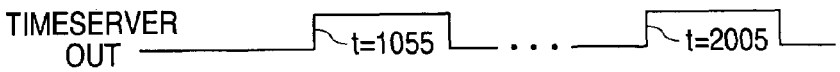
FIG. 1C (PRIOR ART) TIMESERVER OUT
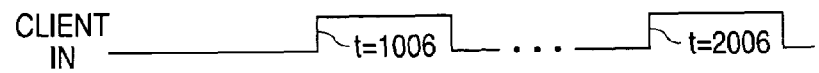
FIG. 1D (PRIOR ART) CLIENT IN
FIG. 2A (PRIOR ART) TIMESERVER OUT
FIG. 2B (PRIOR ART) CLIENT IN
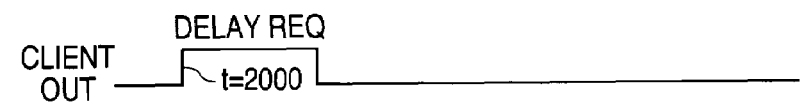
FIG. 3A (PRIOR ART) CLIENT OUT
FIG. 3B (PRIOR ART) TIMESERVER IN
FIG. 3C (PRIOR ART) TIMESERVER OUT
FIG. 3D (PRIOR ART) CLIENT IN

NETWORK FORWARDING DEVICE AND METHOD THAT FORWARD TIMING PACKETS THROUGH THE DEVICE WITH A CONSTANT DELAY

BACKGROUND OF THE INVENTION

1. Field of the Invention

The present invention relates to network forwarding devices and, more particularly, to a network forwarding device and method that forward timing packets through the device with a constant delay.

2. Description of the Related Art

The local clocks in network terminal devices, such as sensors, actuators, and computers, can be synchronized to a master clock in a network timeserver in a number of ways. Once synchronized, the local clocks in the terminal devices track the master clock (within a range of accuracy), thereby allowing events to be time stamped with a common frame of reference.

One well-known approach to synchronizing a local clock to a master clock is defined by the Network Time Protocol (NTP), such as NTP version 3, which has been formalized in RFC 1305. To synchronize the local clock of a terminal (network time client) under the NTP protocol, the network time client inserts an originate time stamp into an NTP data packet, and then outputs then NTP data packet to a network timeserver. The originate time stamp indicates when the NTP data packet was output by the network time client to the network timeserver.

The network timeserver receives the NTP data packet, and inserts a receive time stamp into the NTP data packet. The receive time stamp indicates when the NTP data packet was received by the network timeserver from the network time client. After the receive time stamp has been inserted, the network timeserver inserts a transmit time stamp into the NTP data packet, and sends the NTP data packet back to the network time client. The transmit time stamp indicates when the NTP data packet was output from the network timeserver to the network time client. In addition, when the network time client receives the NTP data packet, the network time client inserts a reference time stamp into the NTP data packet that indicates when the NTP data packet was received from the network timeserver.

The offset OFS needed to synchronize the local clock of the network time client to the master clock of the network timeserver is defined by equation EQ. 1 as:

$$OFS = ((RCVts - ORGts) + (TRANts - REFts))/2 \qquad \text{EQ. 1}$$

where RCVts is the receive time stamp, ORGts is the originate time stamp, TRANts is the transmit time stamp, and REFts is the reference time stamp.

FIGS. 1A-1D show timing diagrams that illustrate a prior-art NTP synchronization exchange. As shown in FIG. 1A, a network time client inserts an originate time stamp of time $t_{ORG}=1000$, as measured by the local clock, into an NTP packet, and then outputs the NTP packet to a network timeserver. As shown in FIG. 1B, the network timeserver receives the NTP packet at time $t_{RCV}=1051$, as measured by the master clock, and then inserts a receive time stamp of $t=1051$ into the NTP packet.

As shown in FIG. 1C, after an internal delay of four clock cycles, the network timeserver inserts a transmit time stamp of time $t_{TRANS}=1055$, as measured by the master clock, into the NTP packet, and then outputs the NTP packet to the network time client. As shown in FIG. 1D, the network time client receives the NTP packet at time $t_{REF}=1006$ as measured by the local clock.

Substituting the example values into equation EQ. 1 provides: $OFS=(1006-1055)+(1000-1051)/2=(-49)+(-51)/2=-100/2=-50$. An offset OFS of −50 indicates that the local clock trails the master clock by a count of 50. As a result, the network time client adds a count of 50 to the local clock to synchronize the local clock with the master clock.

As further shown in FIGS. 1A-1D, during a subsequent time, the network time client inserts an originate time stamp of time $t_{ORG}=2000$, as measured by the local clock, into an NTP packet, and then outputs the NTP packet to the network timeserver. As shown in FIG. 1B, the network timeserver receives the NTP packet at time $t_{RCV}=2001$, as measured by the master clock, and then inserts a receive time stamp of $t_{RCV}=2001$ into the NTP packet.

As shown in FIG. 1C, after an internal delay of four clock cycles, the network timeserver inserts a transmit time stamp of time $t_{TRANS}=2005$, as measured by the master clock, into the NTP packet, and then outputs the NTP packet to the network time client. As shown in FIG. 1D, the network time client receives the NTP packet at time $t_{REF}=2006$ as measured by the local clock.

Substituting the example values into equation EQ. 1 provides: $OFS=((2006-2005)+(2000-2001))/2=(1+(-1))/2=0/2$, which indicates that the local clock and the master clock are synchronized. The process runs continuously in the background to insure that the clocks remain synchronized.

An enhancement to the prior-art NTP synchronization exchange is described in U.S. Patent Application No. 2002 0039370 to Elliot. In Elliot, when an NTP packet is constructed, the originate time stamp inserted into the NTP packet is a predetermined future time. The NTP packet is then placed into an output buffer in the network time client and, when the local clock matches the originate time stamp within the NTP packet, the network time client outputs the NTP packet to the network timeserver at precisely the correct time.

A similar approach is utilized on the return leg. The network timeserver inserts a transmit time stamp into the NTP packet that is a predefined future time. The NTP packet is then placed into an output buffer in the network timeserver and, when the master clock matches the transmit time stamp within the NTP packet, the network timeserver outputs the NTP packet to the network time client at precisely the correct time.

Thus, the network time client in the Elliot patent application outputs the NTP packet with an originate time stamp that precisely matches the actual local time that the packet is output. Similarly, the network timeserver outputs the NTP packet with a transmit time stamp that precisely matches the actual master time that the packet is output. As a result, the enhanced NTP synchronization exchange described by Elliot provides a higher degree of accuracy than does the standard NTP synchronization exchange.

Another common approach to synchronizing a local clock to a master clock is defined by the IEEE 1588 Standard Precision Time Protocol (PTP). The PTP protocol is a two step process, which begins by determining an offset correction. During the first step, the network timeserver outputs a synchronization message and then, after a predetermined time, outputs a follow-up message.

A network time client receives the synchronization message, and adds a client received time stamp to the synchronization message that indicates when the network time client received the synchronization message. The network timeserver, in turn, inserts into the follow-up message a timeserver transmit time stamp that indicates when the network timeserver output the prior synchronization message.

The offset correction OCR can be defined by equation EQ. 2 as:

$$OCR = SRT - MTT - DLY \qquad \text{EQ. 2}$$

where SRT is the client received time stamp, MTT is the timeserver transmit time stamp, and DLY is the delay, a value presently unknown and set to zero.

FIGS. 2A-2B show timing diagrams that illustrate the first step of a prior-art PTP synchronization exchange. As shown in FIG. 2A, a network timeserver outputs a PTP synchronization message at time t=1000, as measured by the master clock in the network timeserver. As shown in FIG. 2B, the network time client receives the PTP message at time t=1060, as measured by the local clock, and then adds a receive time stamp of t=1060 to the PTP message.

As further shown in FIG. 2A, after the predetermined time, the network timeserver outputs a PTP follow-up message at time t=1010, which includes as a data field time t=1000, the time that the network timeserver originally sent the synchronization message. As shown in FIG. 2B, the network time client then receives the follow-up message.

Substituting the example values into equation EQ. 2 provides: OCR=1060−1000−DLY=+60. An offset correction OCR of +60 indicates that the local clock leads the master clock by a count of 60 (assuming no delay).

During the second step, which determines the delay, the network time client records the local clock, and outputs a delay request packet to the network timeserver. The network timeserver receives the delay request packet, and records the master clock time that the delay request packet was received. The network timeserver then generates a delay response packet, which includes the master clock time that the delay request packet was received, and outputs the delay response packet back to the network time client.

The delay DLY is defined by equation EQ. 3 as:

$$DLY = ((SRT - MTT) + (MRS - STM))/2 \qquad \text{EQ. 3}$$

where MRS is the timeserver received time stamp and STM is the client transmit time stamp.

FIGS. 3A-3D show timing diagrams that illustrate the second step of a prior-art PTP synchronization exchange. As shown in FIG. 3A, the network time client records a local clock time of t=2000, and outputs a delay request packet to the network timeserver. As shown in FIG. 3B, the network timeserver receives the delay request packet at time t=1960, and records the master clock time that the delay request packet was received.

As shown in FIG. 3C, the network timeserver then generates a delay response packet, which includes the master clock time of t=1960 that the delay request packet was received, and outputs the delay response packet to the network time client at t=1970. As shown in FIG. 3D, the network time client then receives the delay response packet.

Substituting the example values into equation EQ. 3 provides: OCR=1060−1000−((1060−1000)+(1960−2000))/2=60−20/2=+50. A delay DLY of +50 indicates that the local clock trails the master clock by a count of 50. As a result, the network time client adds a count of 50 to the local clock to become synchronized with the master clock.

Regardless of whether the NTP or PTP protocol is utilized, one problem with these protocols is that they do not account for the variable latency (such as queuing delay) that is present in conventional network forwarding devices, such as repeaters, hubs, switches, routers, multiplexers, and concentrators.

In other words, these network forwarding devices can have a delay of X in the upstream direction, and a delay of Y in the downstream direction. Both the NTP and PTP protocols, however, assume that the delay in the upstream and downstream directions is the same. Clock accuracy degrades significantly when this assumption no longer holds true, such as when a NTP data packet or a PTP message must pass through a conventional forwarding device.

One PTP approach to remove the variable delay introduced by conventional network forwarding devices is to instead use network forwarding devices that support IEEE 1588 time synchronization on the network paths that lie between the network time clients and the master clock source. This approach, known as boundary clocks, requires that each forwarding device support full master, full slave, and the best master algorithm.

Another approach utilized with both the PTP and NTP protocols is the use of transparent switches. In a PTP context, a transparent switch is a network forwarding device that time stamps both the receipt of a synchronization message by the forwarding device, and the transmission of the synchronization message by the forwarding device.

The network forwarding device then identifies the subsequent follow-up message that corresponds with the synchronization message, and inserts the receipt and transmission time stamps generated by the forwarding device into the follow-up message. To determine the delay through the network forwarding device from the network timeserver to the network time client, the network time client utilizes the difference between the transmission and receipt time stamps.

On the other hand, to determine the delay through the network forwarding device from the network time client to the network timeserver, the network forwarding device time stamps both the receipt of a delay request packet by the forwarding device, and the transmission of the delay request packet by the forwarding device.

The network forwarding device then identifies the subsequent delay response packet that corresponds with the delay request packet, and inserts the receipt and transmission time stamps generated by the forwarding device into the delay response packet. The network time client then utilizes the difference between the transmission and receipt time stamps within the delay response packet to determine the delay through the forwarding device from the network time client to the network timeserver.

In an NTP context, a transparent switch is a network forwarding device that time stamps both the receipt of an NTP data packet by the forwarding device from a network time client, and the transmission of the NTP data packet by the forwarding device to a network timeserver in the same manner that a delay request packet is time stamped. The network forwarding device also requires a means for determining the delay through the forwarding device from the network timeserver to the network time client.

The network forwarding device then identifies the NTP data packet on its way back from the network timeserver to the network time client (such as by the originate time stamp). Following this, the network forwarding device modifies the receive time stamp in the NTP data packet to account for the delay through the forwarding device from the network time client to the network timeserver based on the transmission and receipt time stamps. In addition, the network forwarding device also modifies the transmit time stamp based on the means used for determining the delay through the forwarding device from the network timeserver to the network time client.

Although these concepts provide methods of addressing the variable latency of standard network forwarding devices, there remains a need for a simple approach to removing this variability.

SUMMARY OF THE INVENTION

The present invention provides a network forwarding device that forwards timing packets through the device. The network forwarding device includes a plurality of input/output nodes, and a forwarding mechanism connected to the input/output nodes to forward a plurality of timing packets. The forwarding mechanism ensures that all timing packets that are required to make a time determination have substantially an identical delay when passing through the forwarding mechanism.

In addition, an embodiment of the present invention includes a method of removing a variable latency from a network forwarding device that has a plurality of input/output nodes. The method includes receiving a packet from a first network device through a first input/output node, and outputting the packet to a second network device through a second input/output node. The packet has a transmission delay when passing from the first input/output node to the second input/output node. The transmission delay for a packet from any input/output node to any other input/output node is substantially identical.

A better understanding of the features and advantages of the present invention will be obtained by reference to the following detailed description and accompanying drawings that set forth an illustrative embodiment in which the principles of the invention are utilized.

BRIEF DESCRIPTION OF THE DRAWINGS

FIGS. 1A-1D are timing diagrams illustrating a prior-art NTP synchronization exchange.

FIGS. 2A-2B are timing diagrams illustrating the first step of a prior-art PTP synchronization exchange.

FIGS. 3A-3D are timing diagrams illustrating the second step of a prior-art PTP synchronization exchange.

DETAILED DESCRIPTION OF THE INVENTION

Figure 4:
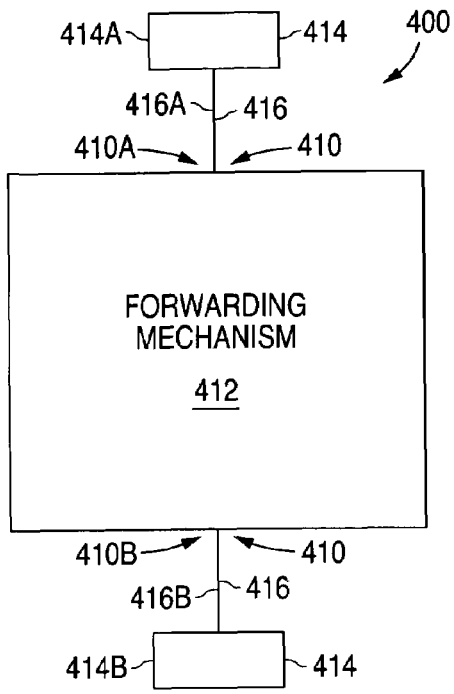
FIG. 4 is a block diagram illustrating an example of a network forwarding device 400 in accordance with the present invention.

FIG. 4 shows a block diagram that illustrates an example of a network forwarding device 400 in accordance with the present invention. As described in greater detail below, the variable latency associated with a network forwarding device is eliminated in the present invention by insuring that the transmission delay for network timing packets moving through the network forwarding device is the same from any input to any output.

As shown in FIG. 4, network forwarding device 400 includes a number of input/output nodes 410, which include a first input/output node 410A and a second input/output node 410B, and a forwarding mechanism 412 that is connected to the input/output nodes 410. (Only two input/output nodes 410 are shown for purposes of simplicity.)

When placed in a network, the input/output nodes 410 are connected to network devices 414, such as a network terminal device, another network forwarding device, and a network timeserver, via network segments 416. For example, first input/output node 410A can be connected to a first network device 414A via a first network segment 416A, while second input/output node 410B can be connected to a second network device 414B via a second network segment 416B.

In operation, forwarding mechanism 412 receives a packet from a node 410, determines which of the remaining nodes 410 are to receive the packet, and then forwards the packet to the remaining nodes 410 that are to receive the packet to output the packet. For example, forwarding mechanism 412 can receive a packet from node 410A, determine that node 410B is to receive the packet, and then forward the packet to node 410B to output the packet.

In accordance with the present invention, forwarding mechanism 412 also ensures that all of the network timing packets that are required to make a time determination have substantially an identical delay when passing through forwarding mechanism 412. To ensure that all of the network timing packets that are required to make a time determination have substantially an identical delay, forwarding mechanism 412 can add a constant known time delay to the traversal times of all of the network timing packets that are required to make a time determination.

In the present invention, when a constant known time delay is added to the traversal time of a network timing packet, the delay provided by the network forwarding device can be accounted for in a straightforward manner. For one-way time transfer protocols, the true time is calculated by subtracting the known forwarding delay of network forwarding device 400, along with any other known delays (there can be more than one forwarding element), from the final time measurement.

For round-trip time transfer protocols, such as the NTP and PTP protocols, the constant forwarding delay cancels out in the time calculation and has no net effect on the time transfer. In other words, if the delay from any input/output node 410 to any other input/output node 410 of network forwarding device 400 is the same, then a constant delay is added to each leg of the trip. When a constant is added to two values which are subtracted from each other, the constant is subtracted out. As a result, with these protocols, the delay associated with a forwarding device can simply be ignored.

For example, equation EQ. 4 is a modified version of equation EQ. 1 that accounts for the delay through a forwarding device as:

$$OFS=(RCVts-ORGts+Y)+(TRANts-REFts-X)/2 \qquad \text{EQ. 4}$$

where X is the delay on the upstream leg and Y is the delay on the downstream leg.

When X and Y are equal, as in the present invention, equation EQ. 4 can be rewritten as equation EQ. 5 as:

$$OFS=(RCVts-ORGts+Y+TRANts-REFts-X)/2. \qquad \text{EQ. 5}$$

As shown in equation EQ. 5, the delays through the forwarding device cancel out and have no effect on the final determination of the offset value.

Thus, forwarding mechanism 412 ensures that all of the network timing packets that are required to make a time determination have substantially an identical delay. The number of timing packets that are required to make a time determination depends on the timing protocol employed.

For example, with round-trip time transfer protocols, such as the NTP protocol, a time determination may be made after one network device 414 outputs a network timing packet and another network device 414 responds to the network timing packet. On the other hand, other round-trip timing protocols, such as the PTP protocol, may require that additional network timing packets be exchanged between the two devices 414 before a time determination can be made.

Figure 5:
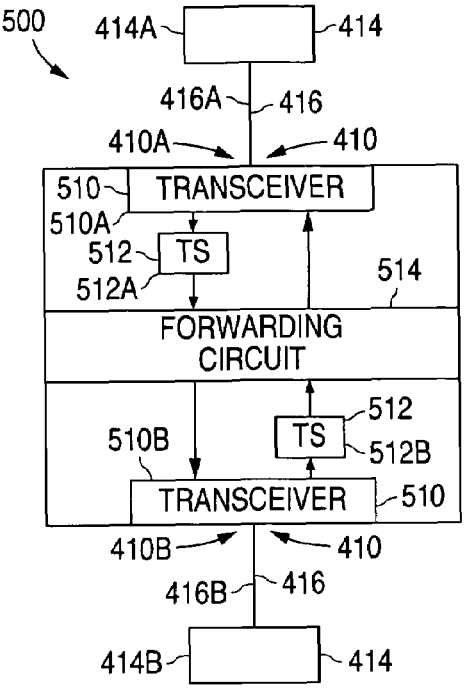
FIG. 5 is a block diagram illustrating an example of a first embodiment 500 of network forwarding device 400 in accordance with the present invention.

FIG. 5 shows a block diagram that illustrates an example of a first embodiment 500 of network forwarding device 400 in accordance with the present invention. As shown in FIG. 5, in embodiment 500, forwarding mechanism 412 includes a number of transceivers 510, including a first transceiver 510A and a second transceiver 510B, that are connected to the input/output nodes 410. The transceivers 510 are formed to be identical to have substantially identical propagation delays, but can alternately be formed to have different known delays.

Further, forwarding mechanism 412 includes a corresponding number of time stamp circuits 512, including a first time stamp circuit 512A and a second time stamp circuit 512B, that are connected to the input/output nodes 410. The time stamp circuits 512 are formed to be identical to have substantially identical propagation delays, but can alternately be formed to have different known delays. In addition, forwarding mechanism 412 includes a forwarding circuit 514 that is connected to the time stamp circuits 512.

For example, transceiver 510A is connected to input/output node 410A, and time stamp circuit 512A is connected to transceiver 510A and forwarding circuit 514. Similarly, transceiver 510B is connected to input/output node 410B, and time stamp circuit 512B is connected to transceiver 510B and forwarding circuit 514.

In operation, each transceiver 510 receives packets from a network segment 416, and outputs the received packets as processed packets to a time stamp circuit 512. In addition, each transceiver 510 receives packets from forwarding circuit 514, and outputs the packets to the network segment 416. Each time stamp circuit 512, in turn, time stamps the processed packets with a stamp time.

The stamp time added to the processed packets can be a current time or a future time as measured by a local clock in device 400. Once a processed packet has been time stamped, the time stamped packet is output to forwarding circuit 514. Forwarding circuit 514, in turn, holds the packet, and then forwards the packet to the transceivers 510 that are to receive the packet so that the packet is output to the corresponding segments 416 at exactly the right time.

For example, a processed packet can be time stamped with a future time FTM that is defined by equation EQ. 6 as:

$$FTM = RTS + BFT \qquad \text{EQ. 6}$$

where RTS represents a receipt time stamp that indicates when the timing packet was received by device 400, and BFT represents a buffer time. The buffer time, in turn, is a fixed value that insures that every packet that passes through device 400 from any input/output node 410 to any other input/output node 410 has an equivalent delay.

The fixed value has a minimum value which is equal to the maximum latency of a packet passing through forwarding circuit 514, and a maximum value that is defined by staleness. There is no advantage to having a fixed value close to the minimum value as the buffer time is to insure an equivalent delay, not a minimum delay. Thus, a value that is greater than the minimum value allows less complex circuitry to be utilized when implementing the invention.

In addition, for one-way time transfer protocols, the buffer time BFT can be output via a message to the network devices 414. The network devices 414 can then adjust the protocol time stamp as needed to remove the value of the buffer time BFT (plus a time for the propagation delays of the transceiver 510 and time stamp circuit 512) from the total transit time.

Thus, in the FIG. 5 embodiment, forwarding mechanism 412 ensures that all of the network timing packets that are required to make a time determination have substantially an identical delay, regardless of which input/output node 410 the packet is received from and output to, or when the timing packet is received.

Forwarding mechanism 412 ensures this by ensuring that every packet, regardless of type, passes through forwarding circuit 514 with a substantially identical delay when the propagation delays through the transceivers 510 and time stamp circuits 512 are substantially identical on both the upstream and downstream paths. When the propagation delays through the transceivers 510 and time stamp circuits 512 are not substantially identical on both the upstream and downstream paths, forwarding circuit 514 adjusts the propagation delay time through circuit 514 to ensure that the delay from one input/output node 410 to any other input/output node 410 is substantially identical.

For example, if network device 414A outputs a first timing packet to network device 414B, and network device 414B responds with a second timing packet, forwarding circuit 514 ensures that the first and second timing packets have the same delay through device 400. In addition, if network device 414A outputs a non-timing packet to network device 414B, forwarding circuit 514 ensures that the first and second timing packets, as well as the non-timing packet, have the same delay through device 400.

Figure 6:
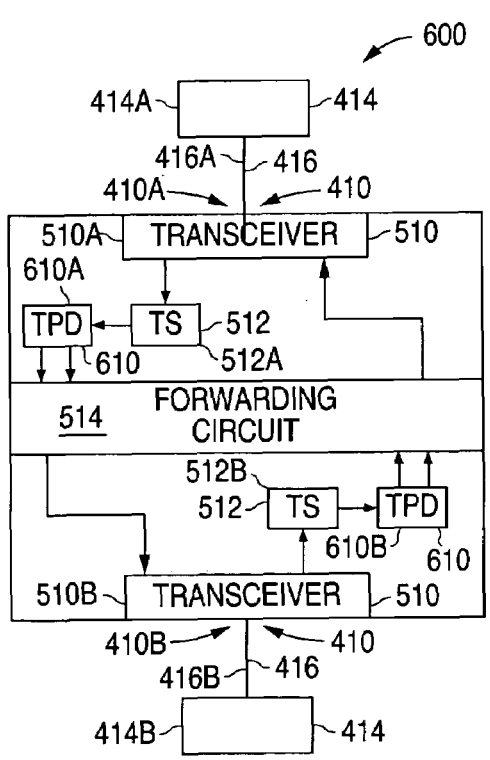
FIG. 6 is a block diagram illustrating an example of a second embodiment 600 of network forwarding device 400 in accordance with the present invention.

FIG. 6 shows a block diagram that illustrates an example of a second embodiment 600 of network forwarding device 400 in accordance with the present invention. Embodiment 600 is similar to embodiment 500 and, as a result, utilizes the same reference numerals to designate the structures which are common to both embodiments.

As shown in FIG. 6, embodiment 600 differs from embodiment 500 in that embodiment 600 includes a number of timing packet detectors 610, including a first packet detector 610A and a second packet detector 610B, that are connected between the time stamp circuits 512 and forwarding circuit 514.

For example, first packet detector 610A is connected to time stamp circuit 512A and forwarding circuit 514, while second packet detector 610B is connected to time stamp circuit 512A and forwarding circuit 514. The timing packet detectors 610 are formed to be identical to have substantially identical propagation delays, but can alternately be formed to have different known delays.

In operation, each timing packet detector 610 differentiates between standard control and data packets as one class of packets, and timing packets as another class of packets. Each timing packet detector 610 then outputs the identified timing and non-timing packets to forwarding circuit 514. When forwarding circuit 514 receives a network timing packet, circuit 514 holds the timing packet, and then forwards the timing packet to the transceivers 510 that are to receive the timing packet so that the timing packet is output to the corresponding segments 416 at the stamp time or a time derived from the stamp time. Further, forwarding circuit 514 forwards, queues, and outputs the non-timing packets in a conventional manner.

Alternately, rather than time stamping all of the packets, a timing packet detector 610 can be connected directly to a transceiver 510 to identify timing packets from the processed packets that are output by the transceiver 510. Only the identified timing packets can then be time stamped by time stamp circuit 512, and output to forwarding circuit 514, thereby preventing the non-timing packets from being time stamped.

Thus, in the FIG. 6 embodiment, forwarding mechanism 412 also ensures that all of the network timing packets that are required to make a time determination have substantially an identical delay, regardless of which input/output node 410 the packet is received from and output to, or when the timing packet is received.

Forwarding mechanism 412 ensures this by ensuring that every network timing packet passes through forwarding circuit 514 with a substantially identical delay when the propagation delays through the transceivers 510, time stamp circuits 512, and timing packet detectors 610 are substantially identical on both the upstream and downstream paths. In this embodiment, non-timing packets can have different delays.

When the propagation delays through the transceivers 510, time stamp circuits 512, and timing packet detectors 610 are not substantially identical on both the upstream and downstream paths (e.g., from device 414A to device 414B, and from device 414B to device 414A), forwarding circuit 514 adjusts the propagation delay time through circuit 514 to ensure that the delay from one input/output node 410 to any other input/output node 410 is substantially identical.

For example, if network device 414A outputs a first timing packet to network device 414B, and network device 414B responds with a second timing packet, forwarding circuit 514 ensures that the first and second timing packets have the same delay through device 400. Similarly, if network device 414B outputs a third timing packet to network device 414A, and network device 414A responds with a fourth timing packet, forwarding circuit 514 ensures that the first, second, third, and fourth, timing packets have the same delay through device 400. However, the delay for non-timing packets forwarded from device 414A to device 414B, or from device 414B to device 414A, can be different.

Figure 7:
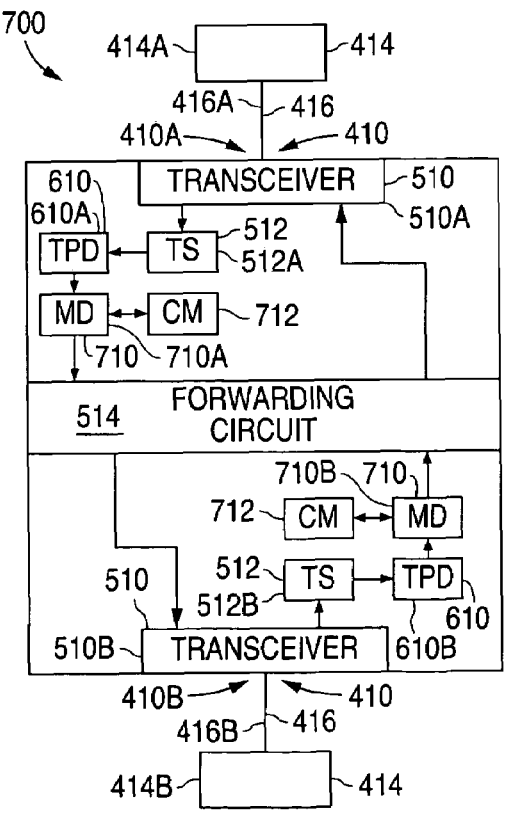
FIG. 7 is a block diagram illustrating an example of a third embodiment 700 of network forwarding device 400 in accordance with the present invention.

FIG. 7 shows a block diagram that illustrates an example of a third embodiment 700 of network forwarding device 400 in accordance with the present invention. Embodiment 700 is similar to embodiment 600 and, as a result, utilizes the same reference numerals to designate the structures which are common to both.

As shown in FIG. 7, embodiment 700 differs from embodiment 600 in that embodiment 700 includes a number of message detectors 710, including a first message detector 710A and a second message detector 710B, that are connected between the timing packet detectors 610 and forwarding circuit 514.

For example, first message detector 710A is connected to packet detector 610A and forwarding circuit 514, while second message detector 710B is connected to packet detector 610B and forwarding circuit 514. The message detectors 710 are formed to be identical to have substantially identical propagation delays, but can alternately be formed to have different known delays.

In operation, each network timing packet represents a type of message, and each message detector 710 identifies the type of message that the timing packet represents. If the message represents the first message of an exchange of network timing messages, message detector 710 determines the known constant delay, and then stores the delay for the message in a common memory 712.

On the other hand, if the message represents a non-first (other than the first) message in the exchange of network timing messages, message detector 710 identifies the first message of the exchange in common memory 712 to determine the known constant delay that was used with the first message of the exchange. Once the known constant delay has been determined, message detector 710 adjusts the stamp time as necessary to ensure that the non-first message has the same known constant delay as the first message.

As above, forwarding circuit 514 holds the timing packet, and then forwards the timing packet to the transceivers 510 that are to receive the timing packet so that the timing packet is output to the corresponding segments 416 at exactly the stamp time or a time derived from the stamp time. Further, forwarding circuit 514 forwards, queues, and outputs the non-timing packets in a conventional manner.

Thus, in the FIG. 7 embodiment, forwarding mechanism 412 ensures that all of the network timing packets which are required to make a single time determination pass through forwarding circuit 514 with a substantially identical delay when the propagation delays through the transceivers 510, time stamp circuits 512, timing packet detectors 610, and message detectors 710 have substantially identical delays on both the upstream and downstream paths. In this embodiment, the network timing packets that are used to make other timing determinations can have different constant delays, while the non-timing packets can have non-constant delays.

When the propagation delays through the transceivers 510, time stamp circuits 512, timing packet detectors 610, and message detectors 710 are not substantially identical on both the upstream and downstream paths, forwarding circuit 514 adjusts the propagation delay time through circuit 514 to ensure that the delay from one input/output node 410 to any other input/output node 410 is substantially identical.

For example, if a single time determination can be made by network device 414A outputting a first timing packet to network device 414B, and network device 414B responding with a second timing packet, forwarding mechanism 412 ensures that the first and second timing packets each have a delay of X when passing through device 400.

However, if network device 414A subsequently makes another time determination by outputting a third timing packet to network device 414B, which responds with a fourth timing packet, forwarding circuit 514 can ensure that the third and fourth timing packets each have a delay of Y when passing through device 400. Thus, although the time delay can vary from time determination to time determination, the time delay for all of the network timing packets required to make one time determination is constant.

Figure 8:
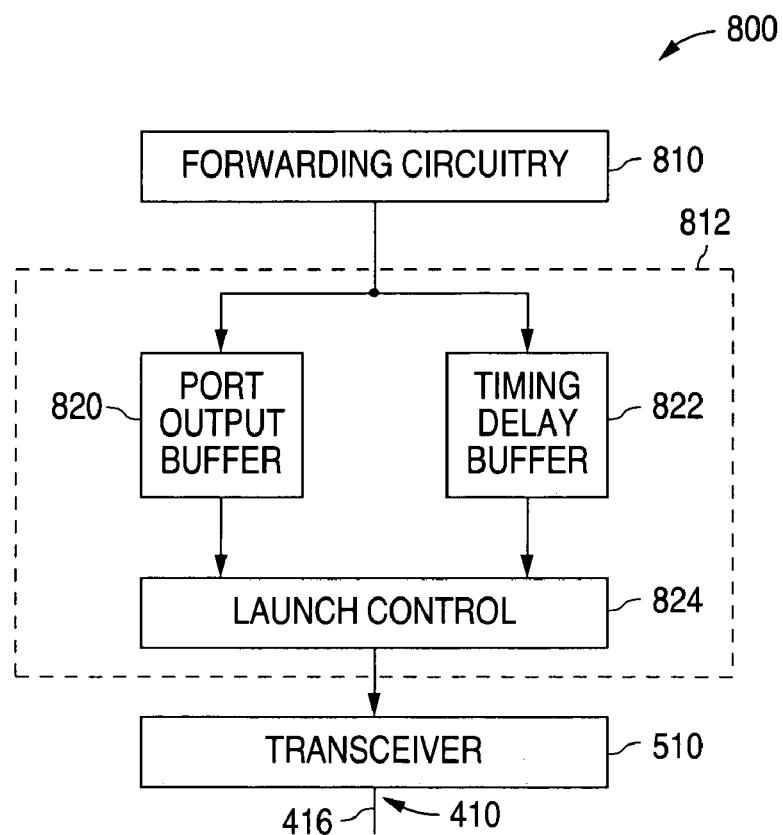
FIG. 8 is a block diagram illustrating an example of a forwarding circuit 800 in accordance with the present invention.

FIG. 8 shows a block diagram that illustrates an example of a forwarding circuit 800 in accordance with the present invention. As shown in FIG. 8, circuit 800 includes routing circuitry 810 that receives a packet, determines which of the input/output nodes is to receive the packet, and forwards the packet.

As further shown in FIG. 8, circuit 800 includes a number of node circuits 812 (only one node circuit 812 is shown for purposes of simplicity) that are connected to forwarding circuitry 810 to receive a forwarded packet. In addition, one node circuit 812 is connected to each transceiver 510.

Each node circuit 812, in turn, includes a port output buffer 820 and a timing delay buffer 822 that are connected to forwarding circuitry 810 to receive forwarded packets. Port output buffer 820 is a standard FIFO that receives control and data packets from forwarding circuitry 810, while timing delay buffer 822 is a buffer that holds timing packets based on a future time associated with the timing packet.

In addition, each node circuit 810 also includes a launch control circuit 824 that is connected to port output buffer 820, timing delay buffer 822, and a transceiver 510. Launch control circuit 824 takes packets from port output buffer 820 and passes the packets to transceiver 510 to output to the network segments 416 as part of normal network traffic. Packets remain in port output buffer 820 a variable amount of time, depending on network load, and vary from input/output node 410 to input/output node 410.

In further accordance with the present invention, launch control circuit 824 also checks timing delay buffer 822 to determine the next future time. In addition, at the correct time, launch control circuit 824 takes a timing packet from timing delay buffer 822 and passes the timing packet to transceiver 510 so that the timing packet is output to a network segment 416 at exactly the time indicated by the future time stamp. The timing packets are normally short and sparse in traffic density, so the transmission of these packets should have little or no impact with respect to delaying normal network traffic to accommodate the timing packets.

Figure 9:
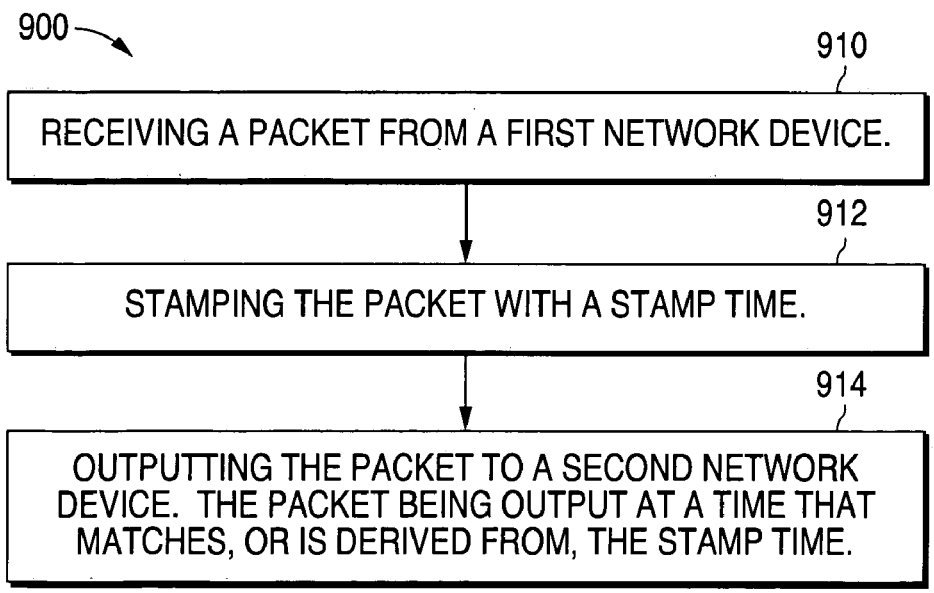
FIG. 9 is a flow chart illustrating an example of a method 900 of removing a variable latency from a network forwarding device that has a plurality of ports in accordance with the present invention.

FIG. 9 shows a flow chart that illustrates a method 900 of removing a variable latency from a network forwarding device that has a number of input/output nodes in accordance with the present invention. As shown in FIG. 9, method 900 begins at 910 by receiving a packet from a first network device through a first input/output node of a network forwarding device.

Following this, method 900 moves to 912 to stamp the packet with a stamp time when the packet has been received by the network forwarding device from the first network device. Next, method 900 moves to 914 to output the packet to a second network device through a second input/output node. In accordance with the present invention, the timing packet is output from the second input/output node at a time that matches, or is derived from, the stamp time that was added in 912.

In method 900, the stamp time can be a sum of a receive time component that indicates when a timing packet was received, and a delay component. The delay component of each stamp time, in turn, can be identical. (Alternately, classes of stamp times can have different delays as long as the delay within the class is the same when making a time determination.) As a result, the delay from any input/output node to any other input/output node of the network forwarding device is the same.

Thus, time information can be accurately distributed through a network using forwarding devices that capture network time packets and forward them again to their destinations after delaying the time packets for a precise period of time. The precise period of delay time is the same time delay for all time packets of a particular type or only just the minimum number of time packets for a particular time transfer measurement. The exact period of time can be arbitrarily chosen (equal to or greater than the minimum) for the convenience of the forwarding device.

As a result, the present invention removes the variable latency associated with standard network forwarding devices by insuring that all timing packets (or all timing packets of a class) required to make a time determination that pass through the network forwarding device of the present invention are delayed by the same amount. Non-timing packets (e.g., control and data packets), on the other hand, can be similarly delayed, or delayed a variable amount in passing from one input/output node to any other input/output node.

The present invention can be utilized with the NTP and PTP timing protocols as well as other protocols and variations, such as the enhanced NTP circuitry and protocol described in U.S. Patent Application No. 2002 0039370 to Elliot, which is hereby incorporated by reference. The present invention can be implemented with, for example, repeaters, hubs, switches, routers, multiplexers, and concentrators, and any combination of these devices.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A forwarding device comprising:
   a plurality of input/output nodes; and
   a forwarding mechanism connected to the input/output nodes to forward a plurality of timing packets, the forwarding mechanism ensuring that all timing packets that are required to make a time determination have substantially an identical delay when passing through the forwarding mechanism, the forwarding mechanism including:
   a plurality of transceivers connected to the plurality of input/output nodes;
   a plurality of time stamp circuits connected to the plurality of transceivers, the time stamp circuits adding a stamp time to a packet when the packet is received to form a time stamped packet, and outputting the time stamped packet;
   a plurality of timing packet detector circuits connected to the plurality of time stamp circuits, the timing packet detector circuits identifying timing packets from non-timing packets; and
   a forwarding circuit connected to the plurality of timing packet detector circuits.

2. The forwarding device of claim 1 wherein the forwarding circuit receives a timing packet from a timing packet detector, holds the timing packet, and then forwards the timing packet to the transceivers that are to receive the timing packet so that the timing packet is output at the stamp time or a time derived from the stamp time.

3. The forwarding device of claim 1 wherein the forwarding circuit ensures that every timing packet passes through the forwarding circuit with a substantially identical delay when propagation delays through the transceivers and time stamp circuits are substantially identical on both upstream and downstream paths.

4. A forwarding device comprising:
   a plurality of input/output nodes; and
   a forwarding mechanism connected to the input/output nodes to forward a plurality of timing packets, the forwarding mechanism ensuring that all timing packets that are required to make a time determination have substantially an identical delay when passing through the forwarding mechanism, the forwarding mechanism including:
   a plurality of transceivers connected to the plurality of input/output nodes;
   a plurality of time stamp circuits connected to the plurality of transceivers, the time stamp circuits adding a stamp time to a packet when the packet is received to form a time stamped packet, and outputting the time stamped packet;

a plurality of timing packet detector circuits connected to the plurality of time stamp circuits, the timing packet detector circuits identifying timing packets from non-timing packets;

a plurality of message detector circuits connected to the plurality of timing packet detector circuits; and a forwarding circuit connected to the plurality of message detector circuits.

5. The forwarding device of claim 4 wherein the forwarding circuit receives a timing packet from a message detector, holds the timing packet, and then forwards the timing packet to the transceivers that are to receive the timing packet so that the timing packet is output at the stamp time or a time derived from the stamp time.

6. The forwarding device of claim 5 wherein the forwarding circuit ensures that every timing packet required to make a first time determination passes through the forwarding circuit with a first substantially identical delay when propagation delays through the transceivers and time stamp circuits are substantially identical on both upstream and downstream paths.

7. The forwarding device of claim 6 wherein the forwarding circuit ensures that every timing packet required to make a second time determination passes through the forwarding circuit with a second substantially identical delay when propagation delays through the transceivers and time stamp circuits are substantially identical on both upstream and downstream paths, the first and second delays being different.

8. The forwarding device of claim 4 wherein the forwarding circuit includes:

fowarding circuitry;

a port delay buffer connected to the fowarding circuitry to receive a plurality of time stamped timing packets from the fowarding circuitry; and a launch control circuit connected to the port delay buffer and a transceiver, the launch control circuit taking a time stamped timing packet from the port delay buffer and outputting the time stamped timing packet to the transceiver based on the time stamp.

* * * * *